Patented June 20, 1939

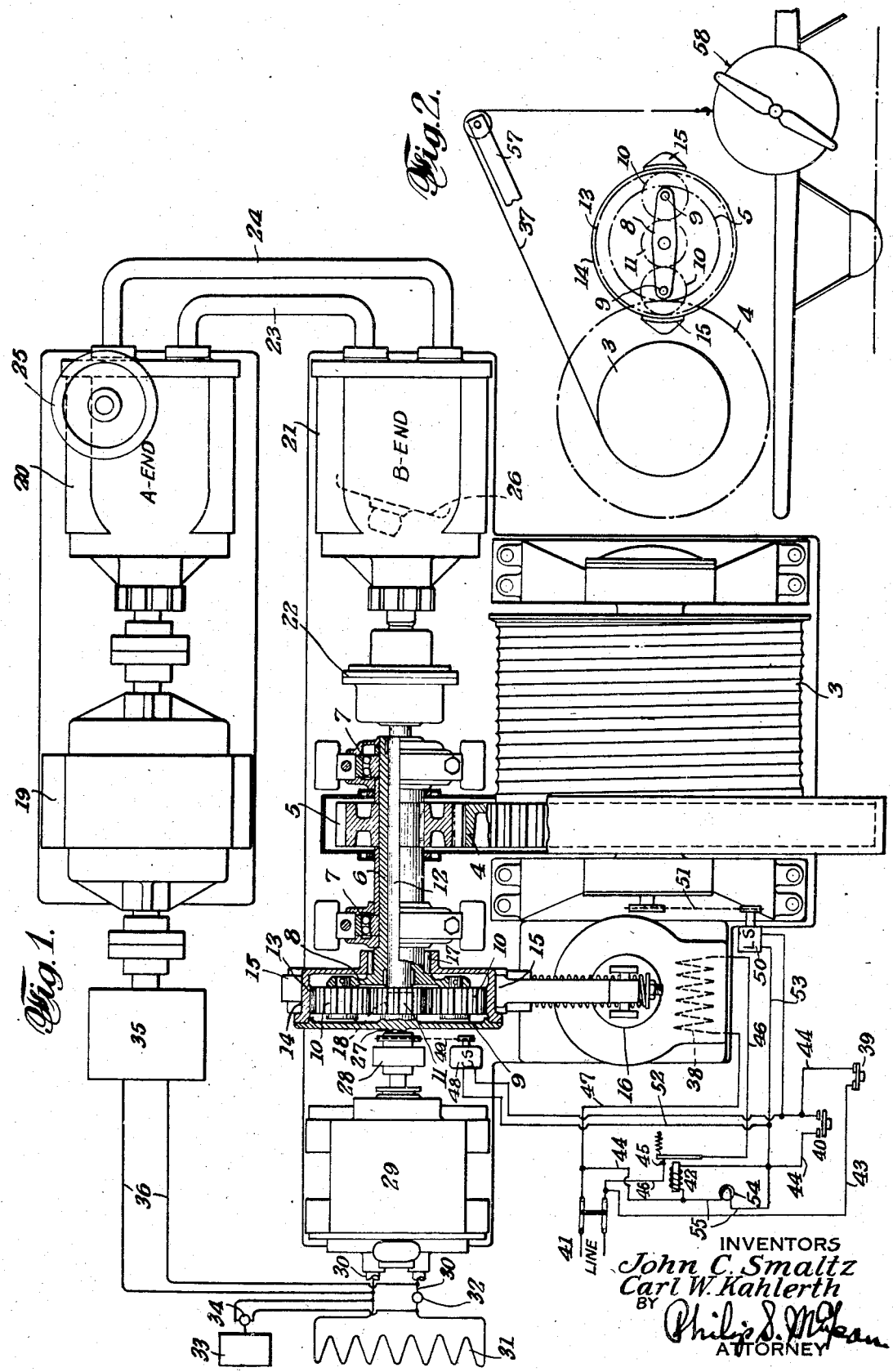

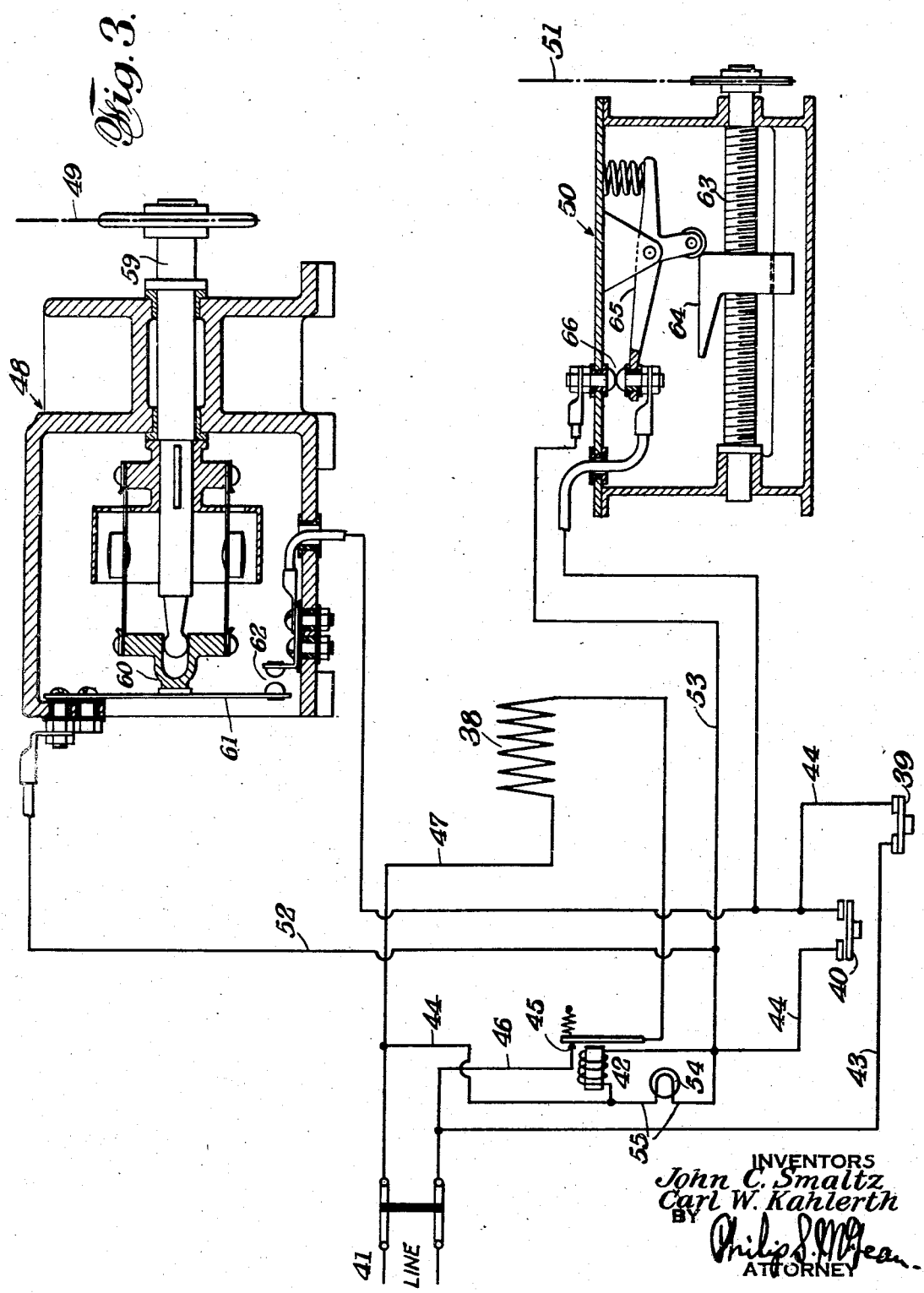

2,163,231

UNITED STATES PATENT OFFICE 2,163,231

AIRPLANE WINCH

John C. Smaltz, New York, N. Y., and Carl W. Kahlerth, Newark, N. J., assignors to McKiernan-Terry Corporation, New York, N. Y., a corporation of New Jersey Application March 1, 1935, Serial No. 8,810

47 Claims. (Cl. 254—172)

This invention relates particularly to winches for handling airplanes, boats or other floating objects where wave motion or equivalent forces are present.

The case of hoisting aboard ship an airplane which has alighted on the water, presents by way of example, one of the important uses of the invention. The rising and falling of the plane on the waves, the roll of the ship, accentuated at the point of suspension at the end of the outswung boom, the wind and tide, introduce forces difficult to counteract and present a problem which, so far as known, has not up to the time of this invention, been successfully met. A very special difficulty has existed in the handling of airplanes, in that sudden hoisting strains, resulting from movement of the ship or seaway, and combinations of both, might weaken or stress internal portions of the airplane structure to such a point as to create a dangerous condition, which could not be known by ordinary or even unusual inspection and precaution.

It is therefore a general object of the present invention to provide a winch which can be relied upon to lift an airplane or other object under conditions such as described, without straining or injuring the object or the hoisting mechanism.

Other, special objects of the invention are to provide a winch of the character indicated, which will be compact in design and therefore adapted to fit into the allotted space on ship board; which will be entirely safe and reliable, easy for an operator to understand and properly control and which will be entirely practical and efficient for the purposes intended.

Other objects and novel features of construction, combinations, relations and arrangements of parts by which the objects are attained are set forth or will appear in the course of the following specification.

The drawings accompanying and forming part of the specification illustrate one of the practical embodiments of the invention, it being understood that the structure may be modified and changed in various ways, all within the true intent and broad scope of the claims.

Fig. 1 in the drawings is a partly diagrammatic and partial plan and broken sectional view of one form of the winch.

Fig. 2 is a diagrammatic representation of the winch as in operation.

Figure 3 is a diagrammatic view with broken sectional illustrations of the centrifugal and limit switches.

The drum of this winch is indicated at 3, having at one end a gear 4, engaged by pinion 5, on a sleeve 6, journalled in bearings 7.

The sleeve 6 constitutes one element of a differential gear set, carrying at one end a head or cross arm 8, supporting on its opposite ends, studs 9, on which are journalled pinions 10.

These two pinions 10 on the ends of the cross arm 8, mesh at the inside with a pinion 11, on a concentrically disposed drive shaft 12, and at the outside with a surrounding annular gear 13, carrying a brake drum 14, engageable by brake shoes 15, under control of a brake magnet indicated generally at 16.

The drive shaft 12 is shown as extending through and journalled within the sleeve 6, and the brake drum is shown as journalled on the sleeve 6 at 17, and as having a pilot bearing at 18, in the end of the gear 11 on shaft 12. Concentricity is thus maintained between the center gear 11, which may be considered the sun gear of the combination, the planetary gears 10 and the surrounding brake drum gear 13.

Variable drive of the drum is effected in the illustration, from a constantly running uni-directional electric motor 19, through a hydraulic transmission comprising a pump unit 20, ordinarily known as the A-end, driven by the motor and a hydraulic motor unit 21, usually known as a B-end, direct connected with drive shaft 12, by a flexible coupling 22, and connected with the A-end by piping 23, 24.

The pump or A-end of the hydraulic drive is shown as equipped with a hand wheel 25, for varying the stroke adjustment and the motor or B-end 21 is indicated at 26, as of the automatic pressure regulated stroke type. By this particular combination, the winch motor unit may be started, stopped, reversed and run at different speeds in opposite directions, by simple adjustment of the hand wheel or other control at the A-end and the winch motor unit by change in pressure occasioned by variation of the load will automatically vary its stroke to carry the heavier load at slower speed. The purpose of these particular attributes will appear.

The internal gear 13, of the differential is shown as having a shaft 27, connected by flexible coupling 28, with the shaft of a hydraulic brake 29. This may be a simple gear pump, but as the invention is fully understood, it will be appreciated that other suitable forms of energy absorbing devices may be employed, such as electrical or mechanical or various combinations of these.

The brake pump is indicated as connected by piping 30, with a suitable form of radiator system 31, this piping system including a relief valve 32, adjusted to the desired braking pressure.

An expansion tank is indicated at 33, to eliminate air from the system so as to keep the system always full of fluid, connected across the radiator and including in its connections a shuttle valve 34, or the like, for insuring connection of the expansion tank to the low pressure side of the system.

A booster or make-up pump is shown at 35, directly operated by the power source 19, or from a separate source of power, and connected by lines 36, to assist in maintaining the desired constant load in the brake pump system.

In operation of the invention, the power motor 19 may be kept constantly running, driving the A-end 20. In the case of hoisting an airplane on shipboard, the A-unit is controlled to effect the lowering of the cable 37, Fig. 2, with just enough tension on the line as predetermined by the constant load of the brake pump to enable proper engagement of the hook with the airplane. This also may be accomplished by operating the mechanism as a fixed drum winch, leaving the brake 15 set, so that the drum will turn as driven by the B-end through the sun and planet gears 11 and 10.

In Fig. 1, controls by which the fixed drum and automatic winch operation can be effected are illustrated as follows:

The magnetic brake 16 is shown as of the open circuit type, in which the brake is set when the magnet circuit is open and released when the magnet circuit is closed. Therefore, with no current in the brake winding 38, the brake will be set and the brake gear 14, held against rotation. At such times, both the switches 39 and 40 are open, so that no current can pass from the line 41 to the brake magnet. Under such circumstances therefore, the winch may be entirely controlled through adjustments at the A-end.

If the plane is to be moored, both switches 39 and 40 are closed. This cuts in a circuit closing relay 42, across the line, through connection switch 39 and connection 43, 44, which relay closes contacts at 45, for the brake circuit 46, 47. Release of the brake through energization of the brake magnet 38, then enables the winch to hold the plane moored at constant tension, which tension can be determined by setting of the relief valve 32, in the hydraulic brake circuit.

For the safe hoisting of the plane from the water, two governing factors require consideration. First, the actual hoisting should be in synchronism with the maximum upward wave velocity. Second, such hoisting should be in time with the high wave of a recurring wave series, so that when lifted out of the water, the pontoons or other parts of the plane cannot be reached and injured by a following combination wave.

To meet these conditions, there is provided in the present illustration, a normally closed circuit centrifugal switch 48, driven as by connections 49, from the brake gear or a related part, which will open circuit when the brake pump approaches or reaches zero angular velocity and a normally closed circuit limit switch 50, operated as by connections 51, from the drum or related part, which will open circuit when the drum has wound in an amount of line corresponding to position of the plane on a high wave. Thus, with maximum upward velocity effected by a high as distinct from one of a lower series of waves, with the brake gear 13, substantially at a standstill and the planetary gears operating at substantially the maximum rate of travel, circuits will be open at both the centrifugal switch and at the limit switch and the simultaneous occurrence of both these open circuits, controls the setting of the brake on the annular gear as follows:

In Fig. 1, with the manual control switch 39 closed and switch 40, open, as illustrated, there will be a circuit through the brake magnet relay 42, so long as circuit is closed at either the centrifugal switch 48, or the limit switch 50, through line 43, switch 39, line 44, and either one or both of the branches 52, 53. These switches being in parallel, it follows that both must open before the brake relay circuit will be interrupted to de-energize the brake magnet and set the brake. This assures that the brake will come on only when these desired conditions of maximum wave velocity and lift resulting from the so-called high wave are present.

When the brake is automatically set in the manner described, the winch at once becomes a fixed drum winch with the sun gear 11, operated from the B motor driving the planetary gears 10, around in the then fixedly held annular gear 13, to drive the drum through sleeve 6, spur pinion 5 and gear 4.

The relief valve 32 of the brake pump 29 may be set to put a proper holding tension on the plane preparatory to the actual lifting off the water. Also the hydraulic transmission consisting of connected pump and motor are of sufficient size and capacity to apply such holding tension at a speed greater than the calculated maximum wave movement and ship roll. This enables the mechanism through the differential described, to pay out and take up on the line in accordance with the wave motion and ship roll while applying a definite desired tension to the load.

By applying this constant tension on rising as well as on falling movements, the load is kept under control and held ready for lifting at the peak velocity of the top combination wave. During such time, the B-end and the sun gear driven by it will be kept turning always in the same direction. The drum however, and the gearing immediately connected therewith, including spur gear 5 and sleeve 6, carrying the cross head 8, will turn first in one direction, as with a lowering wave movement and then in the opposite direction as with a rising wave. The weight and consequent inertia of these parts is kept as low as possible to avoid over-running at the end of movement in each direction, which would cause sudden jerk on the line at the top of a wave and slack line at the bottom of a wave, as the parts start turning in the reverse directions.

In the present illustration, after attachment is made with the plane, it is only necessary for the operator to close the circuit at the switch 39, and to throw the control 25 at the A-end to the full on position. Then, with the switch 40, in the open circuit relation, circuit will be closed through the brake relay 42, by way of either or both the centrifugal and the limit switches 48 and 50, for energizing brake magnet 38, to release the brake shoes or brake band and permit the brake gear 13 to act freely as a differential drive element for the brake pump 29. The excess of energy over that required for applying the desired holding tension to the line 37, is then absorbed in the brake radiating system 30, 31, 32.

until a time of maximum upward movement occurs, which with the brake gear 13, at or approximately at a standstill, centrifugal switch 48, will open its circuit and the limit switch 50, will also have opened its circuit. The relay 42 is then de-energized by interruptions at both the centrifugal switch and the limit switch. Consequently, brake magnet 38 will be de-energized, brake gear 13 will be held stationary and with planet gears 10 turning at maximum speed, actual hoisting of the load will be begun. The increase of pressure in the B-end resulting from this exertion of hoisting energy, automatically increases the stroke at that unit and thus reduces the speed of that unit to a safe hoisting speed. As the final lifting of the plane is started at maximum upward wave velocity, the plane will be lifted at the most effective moment, so that even with the reduced lifting speed, it will ordinarily be clear of the succeeding wave.

Signals or indicators may be provided to inform the operator, particularly as regards conditions for automatic hoisting. In the illustration, a signal light is shown at 54, connected by wiring 55, across the relay 42, so as to show when that relay is energized and consequently when the brake magnet 38 is on and the brake gearing accordingly is operating either for mooring or for automatic lifting as described. Other indicators, such as blinkers for showing conditions of the centrifugal and limit switches may be provided.

Fig. 2 shows in diagrammatic fashion how the hoisting line may be extended outboard by a boom indicated at 57, and attached to a floating object such as an airplane 58.

Figure 3 shows in somewhat greater detail the wiring connections and a suitable form of centrifugal switch 48 and limit switch 50. The centrifugal or speed responsive switch in this case consists simply of a shaft 59 driven from the internal gear and brake member 13, 14 and carrying a ball governor controlled element 60 which, when stationary or rotating slowly, will force the spring 61 over to interrupt the circuit at contacts 62 and which as it rotates or turns faster will permit the spring 61 to move to the right sufficiently to close the circuit at these contact points.

The limit switch is shown as consisting of a screw shaft 63 driven from the drum through connection 51 and operating a nut element 64 which, after a predetermined movement toward the right, will rock the lever 65 to interrupt the circuit 53 at the contact points 66.

In the application of the invention as herein disclosed, the operation may be considered in four different phases:

*First.*—Operation of the winch and the functioning of its various parts during the raising or lowering of the hook under a predetermined tension controlled by the brake pump setting.

*Second.*—The mooring of the plane during its upward and downward movement on the waves and connected to the hoisting line which is under the constant tension predetermined by the brake pump setting.

*Third.*—Operation of the winch when it is automatically converted to a fixed drum winch and proceeds to raise the plane from the water at the moment of maximum upward velocity, such velocity being measured as that point on a combined wave form representing the combination of velocities of boom point and plane with reference to level water line.

*Fourth.*—Conversion of the winch to a fixed drum winch, irrespective of the automatic conversion accomplished in the preceding paragraph and providing mechanism which is always adaptable for use for ordinary hoisting purposes.

Considering these four stages in the order stated:

*First.*—When the plane or object to be hoisted comes within range of the hoisting line, it is desirable that the hook be lowered under control of the A-end and so that the hook position will be accurately controllable and that a predetermined low tension only be on the line. Thus when attendants are attaching the hook to the plane or other floating object, any entanglement of the line under such conditions can produce but a minimum of damage, limited to such tension. When the object is hooked onto, then the line is kept taut by a reversal of direction of movement of the B-end to the constant tensioning hoist position, the line then being held taut under the constant tension holding force determined by the brake pump then operating as a rotatable holding means. During such operations, motion of the drum 3, is effected by rotation of the shaft 12, driving the planetary gears 10, and the internal gear 13, the latter with the brake released being free to either rotate the drum pinion 5, or the brake pump shaft 27. Hence with a predetermined holding force available in the brake pump, only an equal or proportionate degree of tension will be generated in the drum.

*Second.*—With the hook attached to the object on the water, constant tension is created on the line 37, to prevent any slack from rising and falling motion of the floating object. This is accomplished regardless of the upward or downward velocity of the floating object, the B-end being speeded up through the agency of the A-end control shaft, so that its speed is in excess of the maximum upward velocity of the object. When the floating object moves downward, it applies rotative effort to the drum and the meshing gears 4 and 5, rotating the planetary arm 8, with its pinions 10, so that the latter revolve around the sun gear 11. The magnetic brake 15, being released, leaving the internal gear 13 free, this additional velocity of rotating parts over that normally produced by rotation of the sun gear 11, effects increase of speed of the internal gear, governed by the brake pump which is designed and adjusted to maintain substantially constant load and hence constant tension in the hoist line. As the object moored moves upwardly at a velocity somewhat less than can be generated by the rate of rotation by the B-end and attendant gearing, the difference between these two relative velocities will effect rotation of the brake pump and because of the constant load imposed, constant tension will be applied in the hoist line.

It is to be noted that if the moored object rises with velocity equal to that produced by rotation of the B-end and its attendant gearing, internal gear 13 and the brake pump attached thereto will cease rotation. If the rotation of the B-end is at a rate corresponding to the maximum upward velocity of the moored object in combination with upward velocity of the boom, with reference to the level water line, then when the moored object reaches this condition, cessation of rotation of internal gear 13, becomes a direct indication of maximum relative upward velocity and it is this condition, as outlined above, that is, zero angular velocity, which is used to create the automatic hoisting condition. It will be clear from the foregoing description, that this so-called zero indication of maximum upward velocity of the object moored cannot occur when the motion is downward, for then, as indicated in the preceding description, downward movement increases the rate of rotation of the internal gear 13 and its connections.

Third.—From previous description and particularly that in the preceding paragraph, it is clear that automatic hoisting should occur when the internal gear 13, of the differential reaches zero angular movement and also at a time fixed by analysis of wave motion and movement of the boom point as produced by roll of the ship. In hoisting a moored object, the hoisting should occur on a combined wave which is the resultant of the two velocities of boom movement and wave motion and such that will have a following wave of smaller amplitude than the one from which hoisting is effected—so that the following wave will not strike the object being raised before it has had time to clear the water.

This automatic hoisting at maximum upward velocity and on occurrence of the high wave condition, is the result of the combined action of centrifugal switch 48, which opens circuit at or approximately zero angular movement of the internal gear and limit switch 50, which opens circuit with a predetermined amount of line on the drum. Thus with sufficient line on the drum indicating that the moored object is above the normal water line of the ship, the circuit controlling the magnetic brake is so effected (opened) that upon opening of the centrifugal switch circuit at 48, the brake will be automatically set to hold the internal gear 13 against rotation and thus convert the winch into one of fixed drum characteristics.

With pressure regulated control on the B-end as above described, the stroke of this unit when holding for constant tensioning is reduced to approximately 50% of its full value, but when the load, such as produced by the moored object hanging full weight on the hoisting line occurs, the attendant increase in oil pressure in the B-end in its attempt to hoist the increased load, raises the stroke of the B-end, so that with a given quantity of oil being delivered to it by the A-end, the speed of the B-end is proportionately decreased. The latter speed would be that considered proper for operating as a fixed drum winch handling the maximum load intended.

Fourth.—The winch may be immediately and arbitrarily converted to fixed drum characteristics at any time the automatic or load tensioning characteristics are not required, as for service in handling loads from the dock side or other ship purposes, by simply interrupting the brake magnet circuit, so as to set the brake on the internal gear 13. This in itself is a safety feature in that if the brake circuits be accidentally broken, the winch will be thereby automatically converted to a fixed drum winch and be operable accordingly. When converting from automatic to a fixed drum winch, the booster pump 35 may be disconnected from its source of rotating power, as being then unnecessary.

While the invention has been disclosed and particularly described as a winch for hoisting airplanes on shipboard, it will be appreciated that it may be applied to other purposes and in various other combinations where a control is desired for conversion of power into motion of an object in a gradual or controlled sense. It will accordingly be understood further that the parts shown and the language used are primarily illustrative in sense, the invention being of a broad nature and not limited to details illustrated. Also terms employed are used in a descriptive rather than in a limiting sense, except possibly for limitations as may be required by state of the prior art.

What is claimed is:

1. A winch of the character disclosed, comprising a hoisting drum, a power unit for operating the same, rotatable holding means, differential gear driving connections from said power unit to said hoisting drum and to said rotatable holding means, including the following; internal and external gears, one driven by said power unit and the other arranged to rotate the rotatable holding means and interposed planetary gearing between and cooperating with said internal and external gears and operatively connected with said drum, and controllable braking means for holding the gear which rotates the rotatable holding means to effect application of the full power through said differential gear driving connections to said hoisting drum.

2. A winch of the character disclosed, comprising a variably controllable hydraulic pump, a hydraulic motor of the automatic pressure regulated stroke type connected therewith, internal and external gears, one driven by said pressure controlled variable stroke hydraulic motor, controllable braking means for the other gear, energy absorbing means driven by said last mentioned gear, interposed planetary gearing between and operatively connected with said internal and external gears and a hoisting drum in driven-driving relation with said planetary gearing.

3. A winch of the character disclosed, comprising a variably controllable hydraulic pump, a hydraulic motor of the automatic pressure regulated stroke type connected therewith, internal and external gears, one driven by said pressure controlled variable stroke hydraulic motor, controllable braking means for the other gear, energy absorbing means driven by said last mentioned gear, interposed planetary gearing between and operatively connected with said internal and external gears, a hoisting drum in driven-driving relation with said planetary gearing and means operating according to amount of hoisting line wound on said drum for governing operation of said controllable brake.

4. A winch of the character disclosed, comprising a variably controllable hydraulic pump, a hydraulic motor of the automatic pressure regulated stroke type connected therewith, internal and external gears, one driven by said pressure controlled variable stroke hydraulic motor, controllable braking means for the other gear, energy absorbing means driven by said last mentioned gear, interposed planetary gearing between and operatively connected with said internal and external gears, a hoisting drum in driven-driving relation with said planetary gearing and speed responsive means driven from the gear which drives said energy absorbing means for governing operation of said controllable brake.

5. A winch of the character disclosed, comprising a variably controllable hydraulic pump, a hydraulic motor of the automatic pressure regulated stroke type connected therewith, internal and external gears, one driven by said pressure controlled variable stroke hydraulic motor, controllable braking means for the other gear, energy absorbing means driven by said last mentioned gear, interposed planetary gearing between and operatively connected with said internal and external gears, a hoisting drum in driven-driving relation with said planetary gearing and means governed by speed of the gear subjected to said brake control and according to amount of line wound on said hoisting drum for governing operation of said controllable brake.

6. A winch of the character disclosed, comprising a variably controllable hydraulic pump, a hydraulic motor of the automatic pressure regulated stroke type connected therewith, internal and external gears, one driven by said pressure controlled variable stroke hydraulic motor, controllable braking means for the other gear, energy absorbing means driven by said last mentioned gear, interposed planetary gearing between and operatively connected with said internal and external gears, a hoisting drum in driven-driving relation with said planetary gearing, means for effecting automatic control of said brake and means for arbitrarily operating said brake independently of said automatic control.

7. Apparatus of the character disclosed, comprising power consuming means, rotary holding means, a power unit for driving both said means, differential drive connections from said power unit to said power consuming means and to said rotary holding means respectively and including an element which may be conditioned to effect transmission of all the power from the power unit to the power consuming means and means for so conditioning said element of the differential drive connections.

8. Apparatus of the character disclosed, comprising power consuming means, rotary holding means, a power unit for driving both said means, differential drive connections from said power unit to said power consuming means and to said rotary holding means respectively and including an element which may be conditioned to effect transmission of all the power from the power unit to the power consuming means, means for so conditioning said element of the differential drive connections and means for automatically indicating such conditioning of the differential drive connection element.

9. A winch of the character disclosed, comprising a uni-directional driving motor, a manually controlled variable stroke hydraulic pump driven thereby, a hydraulic motor of the automatic pressure regulated variable speed type connected in driven relation to said variable stroke hydraulic pump, a sun gear driven by said automatic pressure regulated hydraulic motor, a hoisting drum, planetary gears in mesh with said sun gear and connected in driving relation to said hoisting drum, an internal gear in mesh with said planetary gears, energy absorbing means connected in driven relation with said internal gear, a brake for controlling said internal gear and means governing operation of said brake.

10. A winch of the character disclosed, comprising a uni-directional driving motor, a manually controlled variable stroke hydraulic pump driven thereby, a hydraulic motor of the automatic pressure regulated variable speed type connected in driven relation to said variable stroke hydraulic pump, a sun gear driven by said automatic pressure regulated hydraulic motor, a hoisting drum, planetary gears in mesh with said sun gear and connected in driving relation to said hoisting drum, an internal gear in mesh with said planetary gears, energy absorbing means connected in driven relation with said internal gear, means governing operation of said brake, including a limit switch operable in conjunction with said hoisting drum, a speed responsive switch operable in conjunction with said internal gear and controlling circuits for said brake under joint control of said limit and speed responsive switches.

11. A winch of the character disclosed, comprising a uni-directional driving motor, a manually controlled variable stroke hydraulic pump driven thereby, a hydraulic motor of the automatic pressure regulated variable speed type connected in driven relation to said variable stroke hydraulic pump, a sun gear driven by said automatic pressure regulated hydraulic motor, a hoisting drum, planetary gears in mesh with said sun gear and connected in driving relation to said hoisting drum, an internal gear in mesh with said planetary gears, energy absorbing means connected in driven relation with said internal gear, a brake for controlling said internal gear, means governing operation of said brake, including a limit switch operable in conjunction with said hoisting drum, a speed responsive switch operable in conjunction with said internal gear, controlling circuits for said brake under joint control of said limit and speed responsive switches and means for arbitrarily controlling the brake operation independently of the joint control of said limit and speed responsive switches.

12. A winch of the character disclosed, comprising a uni-directional driving motor, a hydraulic pump operated thereby, a hydraulic motor connected in driven relation to said pump, a sun gear operated by said hydraulic motor, a hoisting drum, planetary gears engaged with said sun gear and connected in driving relation to said hoisting drum, an internal gear engaged by said planetary gears, a brake for controlling said internal gear, a speed responsive device driven from said internal gear and brake controlling means operable from said speed responsive device.

13. In combination with a driven member and a motor for driving the same, a pump, differential gear drive connections from said driving motor to said driven member and to said pump respectively, a relief valve connected to regulate said pump and means for controlling said differential gear connections to transmit part only of the power of said driving motor to both driven member and pump or all the power of said driving motor to said driven member only.

14. In combination with a driven member and a motor for driving the same, a pump, differential gear drive connections from said driving motor to said driven member and to said pump respectively, a relief valve connected to regulate said pump, means for controlling said differential gear connections to transmit part only of the power of said driving motor to both driven member and pump or all the power of said driving motor to said driven member only and including means for increasing the power and reducing the speed applied to said driven member through said differential gearing.

15. In combination with a driven member and a motor for driving the same, holding means, differential gear drive connections from said driving motor to said driven member and holding means respectively, means for controlling said differential gear connections to transmit part only of the power of said driving motor to both driven member and holding means or all the power of said driving motor to said driven member only and including interconnected control devices governed by the extent of movement of said driven member and by speed of movement of an element of said differential gearing.

16. In combination with a driven member and a motor for driving the same, torque generating means, differential gear drive connections from said driving motor to said driven member and torque generating means respectively and means for controlling said differential gear connections to transmit part only of the power of said driving motor to both driven member and torque generating means or all the power of said driving motor to said driven member only, said controlling means including both speed responsive mechanism operating on said differential gear connections under predetermined speed conditions of said differential gear connections and arbitrary control means operable manually irrespective of speed operating conditions.

17. A winch of the character disclosed, comprising a uni-directional driving motor, a manually controlled variable stroke hydraulic pump driven thereby, a hydraulic motor of the automatic pressure regulated variable speed type connected in driven relation to said variable stroke hydraulic pump, a hoisting drum, energy absorbing means, differential gearing drive connections from said automatic pressure regulated hydraulic motor to said hoisting drum and to said energy absorbing means, means for regulating said energy absorbing means to effect operation of said hoisting drum as a constant tension device and means for controlling said differential drive connections to transform action of the drum from constant tension to fixed drum operation.

18. In apparatus of the character disclosed, the combination of a hoisting drum, power means for operating same, a brake pump, differential drive gearing from said power means to said drum and brake pump, a relief valve for determining the load developed by said brake pump and a constantly running booster pump connected in assisting relation with said brake pump.

19. A winch of the character disclosed, comprising in combination with a drive shaft, a planetary gear set consisting of a sun gear on said drive shaft, planetary gears in mesh with and operable about said sun gear and an internal gear in mesh with and rotatable about said planetary gears, load creating means driven by said internal gear, means operable for holding said internal gear against rotation and a hoisting drum driven from said planetary gears.

20. A winch of the character disclosed, comprising in combination with a drive shaft, a planetary gear set consisting of a sun gear on said drive shaft, planetary gears in mesh with and operable about said sun gear and an internal gear in mesh with and rotatable about said planetary gears, load creating means driven by said internal gear, means operable for holding said internal gear against rotation, a hoisting drum driven from said planetary gears, said load creating means including a brake pump and a relief valve therefor for predetermining the torque developed.

21. A winch of the character disclosed, comprising in combination a drive shaft, a sun gear on said drive shaft, a tubular shaft operable about said drive shaft, planetary gears carried by said tubular shaft and in mesh with said sun gear, a hoisting drum, drive gearing from said tubular shaft to said hoisting drum an internal gear in mesh with and rotatable about said planetary gears, torque creating means driven from said internal gear and braking means for holding said internal gear.

22. A winch of the character disclosed, comprising a drive shaft, a driving motor at one end of said shaft, a sun gear at the opposite end of said shaft, a tubular shaft rotatable about said drive shaft, planetary gears at one end of the tubular shaft in mesh with the sun gear, a pinion on the opposite end portion of said tubular shaft, a hoisting drum driven from said pinion an internal gear in mesh with and rotatable about said planetary gears, means for generating substantially constant load connected in driven relation with said internal gear and braking means for holding said internal gear.

23. A winch of the character disclosed, comprising in combination a hoisting drum, a driving motor therefor, load producing means, differential drive gearing from said motor to said hoisting drum and to said load producing means for effecting constant tension operation of said hoisting drum through said differential drive gearing at the tension determined by said load producing means and means for controlling said differential drive gearing to effect fixed hoisting operation of said drum independent of said load producing means.

24. A winch of the character disclosed, comprising in combination a hoisting drum, a motor, load producing means, differential drive connections from said motor to said drum and to said load producing means for effecting constant tension operation of said drum at the tension determined by said load producing means, said differential drive connections including differentially driven parts respectively operating said drum and said load producing means and means jointly controlled by said drum and by said differential drive gearing for holding that part of the differential drive gear which operates the load producing means to convert the winch from constant tension operation of the drum to fixed hoisting operation of the drum independent of said load producing means.

25. A winch of the character disclosed, comprising a uni-directional driving motor, a manually controlled variable stroke hydraulic pump driven thereby, a hydraulic motor of the automatic pressure regulated variable speed type connected in driven relation to said variable stroke hydraulic pump, a differential gear set including a driving member operated from said hydraulic motor, an opposed member and an intermediate member in driving-driven relation between said driving member and opposed member, rotating load producing means driven from said opposed member, a hoisting drum driven from said intermediate member, a brake for holding said opposed member of said differential gear set and means governing the operation of said brake.

26. A winch of the character disclosed, comprising in combination with a drive shaft, a differential gear set including a driving member on said shaft, an opposed driven member and an intermediate member in driving-driven relation between said driving member and opposed driven member, rotating load creating means driven by said opposed member, means for predetermining the load created by rotation of said load creating means, means operable for holding said opposed driven member against rotation and a hoisting drum driven from said intermediate member.

27. A constant tension winch, comprising a hoisting drum, a motor, a brake pump, a relief valve connected with said pump to determine the load developed thereby, a differential gear set including opposing elements, one operated by said motor and the other arranged to drive said brake pump and an intermediate element between said opposing elements and arranged to drive said drum, a brake for holding the element of the differential which drives the brake pump and means for controlling operation of said brake.

28. A winch of the character disclosed, comprising a hoisting drum, a driving motor therefor, a shaft connected at one end with said motor, a driving element of a differential gear set on the opposite end of said shaft, a driven element of a differential gear set, rotary load producing means, drive connections from said differential driven member to said rotary load producing means, an intermediate element of a differential gear set interposed between said driving and driven elements and concentrically disposed with respect to said motor driven shaft, a gear on said intermediate element driven shaft, a gear on the hoisting drum engaged by said last mentioned gear, means for regulating the torque generated by said load producing means and a controllable brake for holding said driven element of the differential gear set.

29. A winch of the character disclosed, comprising in combination, a hoisting drum carrying a cable for attachment to a floating object, load producing means, means for setting said load producing means for a substantially constant load, a differential gear set including a driving member, a driven member and an intermediate member, a motor for operating said driving member, one of said other two members of the differential gear set being connected to drive said hoisting drum and the remaining member of said differential gear set being connected to drive said load producing means and controllable means for holding said last member.

30. A winch of the character disclosed, comprising in combination, a hoisting drum carrying a cable for attachment to a floating object, load producing means, means for setting said load producing means for a substantially constant load, a differential gear set including a driving member, a driven member and an intermediate member, a motor for operating said driving member, one of said other two members of the differential gear set being connected to drive said hoisting drum and the remaining member of said differential gear set being connected to drive said load producing means, controllable means for holding said last member and means operable in the operation of the drum in a winding-on direction for causing said holding means to hold the differential gear member which drives the load producing means.

31. A winch of the character disclosed, comprising a hoisting drum carrying a cable for attachment to a floating object, controllable means for operating said drum to apply substantially constant tension to a rising and falling floating object attached to said cable and to operate said drum to hoist said object from the water, means for automatically indicating maximum hoisting velocity of said drum during said constant tensioning and mechanism for controlling said operating means to change from constant tensioning to hoisting operation of said drum at an indicated time of maximum hoisting velocity of the drum.

32. A winch of the character disclosed, comprising a hoisting drum carrying a cable for attachment to a floating object, controllable means for operating said drum to apply substantially constant tension to a rising and falling floating object attached to said cable and to operate said drum to hoist said object from the water, means for automatically indicating maximum hoisting velocity of said drum during said constant tensioning and mechanism for controlling said operating means to change from constant tensioning to hoisting operation of said drum at a time of indicated maximum hoisting velocity of said drum and including a manual control which may be arbitrarily operated at a maximum hoisting time shown by said automatic indicating means.

33. A winch of the character disclosed, comprising a hoisting drum carrying a cable for attachment to a floating object, controllable means for operating said drum to apply substantially constant tension to a rising and falling floating object attached to said cable and to operate said drum to hoist said object from the water, means automatically operable to indicate a maximum upper position of the rising and falling floating object during said constant tensioning and mechanism for controlling said operating means to change same from constant tensioning to hoisting operation of said drum.

34. A winch of the character disclosed, comprising a hoisting drum carrying a cable for attachment to a floating object, controllable means for operating said drum to apply substantially constant tension to a rising and falling floating object attached to said cable and to operate said drum to hoist said object from the water, means automatically operable to indicate a maximum upper position of the rising and falling floating object during said constant tensioning, mechanism for controlling said operating means to change same from constant tensioning to hoisting operation of said drum, including a manual control which may be arbitrarily operated at a maximum height position shown by said automatic indicating means.

35. A winch of the character disclosed, comprising a hoisting drum carrying a cable for attachment to a floating object, controllable means for operating said drum to apply substantially constant tension to a rising and falling floating object attached to said cable and to operate said drum to hoist said object from the water, means automatically operable to indicate a maximum upper position of the rising and falling floating object during said constant tensioning, mechanism for controlling said operating means to change same from constant tensioning to hoisting operation of said drum, including a device governed according to the amount of line wound upon said hoisting drum.

36. A winch of the character disclosed, comprising a hoisting drum carrying a cable for attachment to a floating object, controllable means for operating said drum to apply substantially constant tension to a rising and falling floating object attached to said cable and to operate said drum to hoist said object from the water, means for automatically indicating maximum velocity rising movement and maximum upper position of said rising and falling object during said constant tensioning and mechanism for controlling said operating means to change same from constant tensioning to hoisting operation of said drum.

37. A winch of the character disclosed, comprising a hoisting drum carrying a cable for attachment to a floating object, controllable means for operating said drum to apply substantially constant tension to a rising and falling floating object attached to said cable and to operate said drum to hoist said object from the water, means for automatically indicating maximum velocity rising movement and maximum upper position of said rising and falling object during said constant tensioning, mechanism for controlling said operating means to change same from constant tensioning to hoisting operation of said drum, including a speed responsive device and a device governed by the amount of line wound on the drum cooperable to automatically effect the conversion from constant tensioning to hoisting operation of the drum.

38. A winch of the character disclosed, comprising a hoisting drum carrying a cable for attachment to a floating object, controllable means for operating said drum to apply substantially constant tension to a rising and falling floating object attached to said cable and to operate said drum to hoist said object from the water and means governed according to turning speed of said drum in a hoisting direction for automatically changing said operating means from constant tensioning to hoisting operation at a time of maximum upward velocity of said floating object.

39. A winch of the character disclosed, comprising a hoisting drum carrying a cable for attachment to a floating object, controllable means for operating said drum to apply substantially constant tension to a rising and falling floating object attached to said cable and to operate said drum to hoist said object from the water and means governed according to amount of cable on said hoisting drum for automatically changing said operating means from constant tensioning to hoisting operation of said drum at a time of maximum upper position of said rising and falling floating object.

40. A winch of the character disclosed, comprising a hoisting drum carrying a cable for attachment to a floating object, controllable means for operating said drum to apply substantially constant tension to a rising and falling floating object attached to said cable and to operate said drum to hoist said object from the water and means governed according to turning speed of said drum in a hoisting direction and amount of line on said drum automatically operable according to the speed of the drum and the amount of line wound thereon for changing said operating means from constant tensioning to hoisting operation at a time of maximum upward velocity and maximum upper position of said rising and falling floating object.

41. A winch of the character disclosed, comprising a hoisting drum carrying a cable for attachment to a floating object, a differential gear set including a driven member connected for operating said drum, a driving member in driving engagement with said driven member and a rotary reaction member engaged by said driven member, a motor for operating said driving member and means for opposing rotation of said reaction member to produce operation of said drum through said differential gearing under a tension proportionate to said opposing force or for holding said reaction member against rotation, to thereby pass all the applied power of the driving member to positive operation of the drum, said latter means including a brake pump operated by said reaction member and a controllable brake for positively holding said reaction member against rotation.

42. A winch for hoisting a floating object, comprising a hoisting drum carrying a cable for attachment to a floating object, power means for operating said drum, a brake pump, differential drive gearing from said power means to said drum and to said brake pump and a booster pump operating while said brake pump is in operation and connected to overcome the normal leakage resulting in the operation of said brake pump.

43. A winch comprising a hoisting drum carrying a cable for attachment to a floating object, power means for operating the same, a brake pump, a radiator system connected with said brake pump and differential gearing from said power means to said hoisting drum and to said brake pump.

44. A winch comprising a hoisting drum carrying a cable for attachment to a floating object, power means for operating the same, a brake pump, a radiator system connected with said brake pump, differential gearing from said power means to said hoisting drum and to said brake pump and an expansion tank connected to maintain said radiator system full of fluid for the brake pump.

45. A winch of the character disclosed, comprising a hoisting drum for a cable for attachment to a floating object, differential gearing, including rotating intermeshing driving, driven and reaction gears, a motor connected to operate said driving gear, driving connections from said driven gear to said hoisting drum, a brake pump driven by said reaction gear for applying a substantially constant holding force to said reaction gear, and means for definitely securing said reaction gear at a time when the angular movement of the same is zero, or approximately so.

46. A winch of the character disclosed comprising a hoisting drum for a cable for attachment to a floating object, differential gearing, including rotating intermeshing driving, driven and reaction gears, a motor connected to operate said driving gear, driving connections from said driven gear to said hoisting drum, means for applying a substantially constant holding force to said reaction gear, means for definitely securing said reaction gear at a time when the angular movement of the same is zero, or approximately so, said substantially constant holding means including a rotary member opposing the rotation of said reaction gear and said positive securing means, including a brake for securing said reaction gear against angular movement.

47. A winch of the character disclosed, comprising in combination, a hoisting drum, a driving motor, differential driving connections from said driving motor, including a driving member operated by said motor, a driven member connected to drive said drum and a rotary reaction member interposed between said driving and driven members, a rotary load imposing member driven by said reaction member and arranged to oppose rotation of the latter with substantially constant torque at all speeds, means for indicating zero rotation of said reaction member and means for securing said reaction member at a time of zero rotation shown by said indicating means, to thereby through said differential gearing apply full power of the driving motor to operation of said hoisting drum.

JOHN C. SMALTZ.
CARL W. KAHLERTH.